United States Patent

Cammack

[15] 3,690,295
[45] Sept. 12, 1972

[54] COMBINATION BOOK MARK AND READING GUIDE

[72] Inventor: Jim Cammack, 72 Ustick Rd., Boise, Idaho 83704

[22] Filed: Jan. 11, 1971

[21] Appl. No.: 105,289

[52] U.S. Cl. .....................116/119, 40/352, 281/42
[51] Int. Cl. .............................................B42d 9/00
[58] Field of Search ...116/119, 114; 281/42; 40/352, 40/353, 354, 355, 356

[56] References Cited

UNITED STATES PATENTS

| | | | |
|---|---|---|---|
| 1,084,665 | 1/1914 | Sheldon | 116/119 |
| 1,478,655 | 12/1923 | Hughes | 116/119 |
| 1,658,499 | 2/1928 | Stevens | 116/119 |
| 2,590,615 | 3/1952 | Heckendorn | 116/119 |
| 3,408,977 | 11/1968 | Colman, Jr. | 116/119 |

FOREIGN PATENTS OR APPLICATIONS 422,737    1/1935    Great Britain...............40/352

*Primary Examiner*—Louis J. Capozi
*Attorney*—John W. Kraft

[57] ABSTRACT

A combination book mark and reading guide comprising a card-like body portion having an irregular reading line formed by a multiplicity of adjacent plain line segments along one of the terminal edges of the body portion. A multiplicity of embossed or printed border-like portions coincident with each of the respective line segments may be distally disposed on the card-like body adjacent each of the respective segments wherein each of said portions include an ornamental design or color different from that of an adjacent portion to produce a frame-like portion operable to optically emphasize fully exposed indicia on a printed page.

3 Claims, 4 Drawing Figures

PATENTED SEP 12 1972 3,690,295
SHEET 1 OF 2
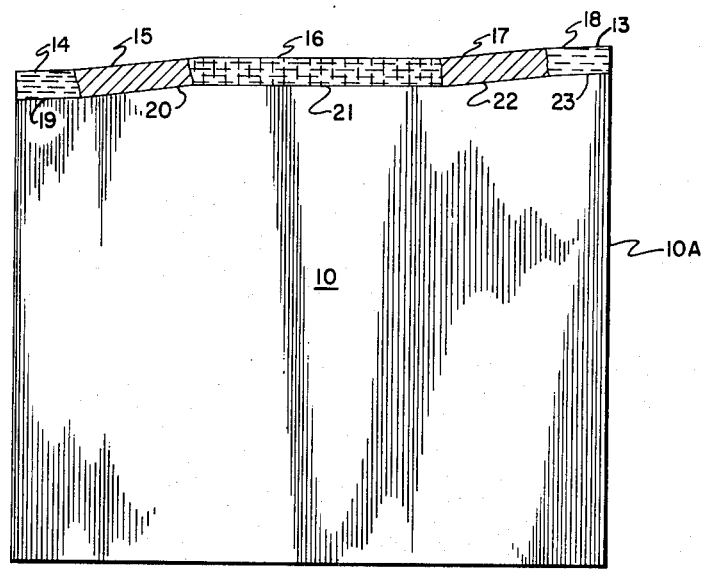
FIG. 1
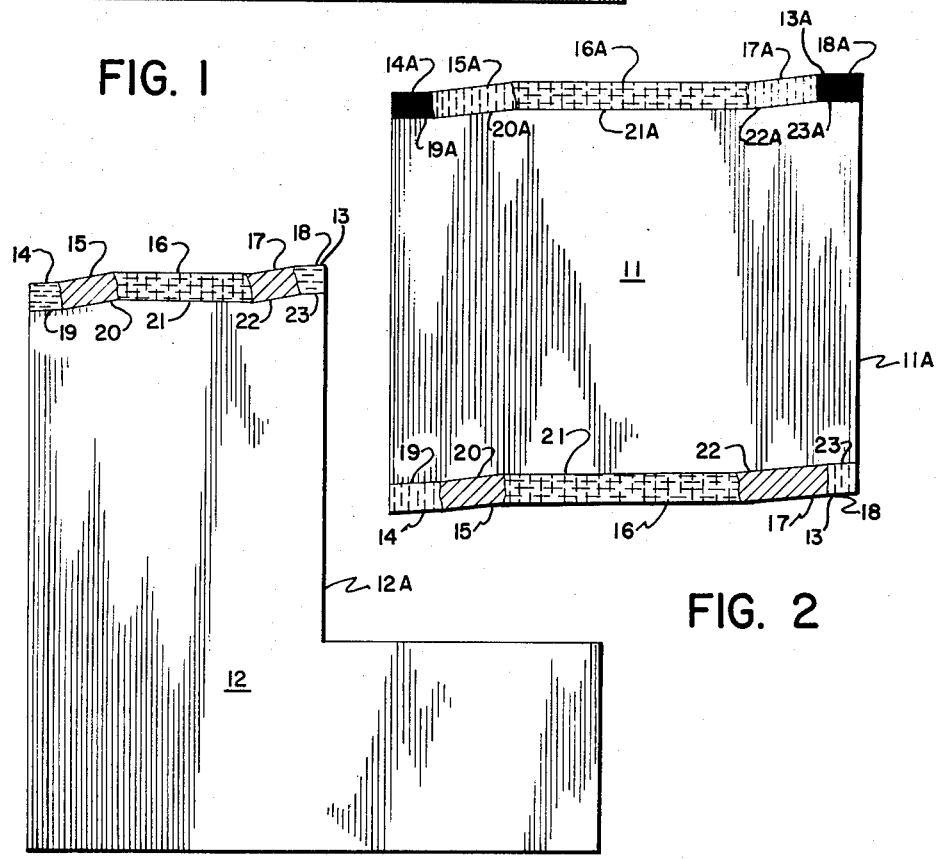
FIG. 2
FIG. 3
JIM CAMMACK INVENTOR.
BY John W. Kraft

JIM CAMMACK  INVENTOR.

COMBINATION BOOK MARK AND READING GUIDE

FIELD OF INVENTION

The present invention relates to combination book marks and reading guides and more particularly to a reading guide having an irregular reading line along a terminal edge formed by a multiplicity of adjacent plain line segments operable to provide a frame-like portion for fully exposed printed indicia on a printed page.

BRIEF DESCRIPTION OF THE PRIOR ART

Reading guides formerly known in the prior art generally comprise a straight ruler-like guide which covers succeeding lines of printed indicia. Such guides do not tend to optically emphasize lines above the guide or to optically differentiate a fully exposed line of printed indicia exposed to view by such guide from other lines also exposed.

Accordingly, it is an object of this invention to provide a reading guide including a frame-like portion which tends to optically emphasize a line of printed indicia to be read.

This and other objects shall become apparent from the description following, it being understood that modifications may be made without affecting the teachings of the invention here set out.

Generally this invention comprises a combination book mark and reading guide comprising a card-like body portion having an irregular reading line formed by a multiplicity of adjacent plain line segments along one of the terminal edges of the body portion. A multiplicity of embossed or printed border-like portions coincident with each of the respective line segments may be distally disposed on the card-like body adjacent each of the respective segments wherein each of said portions include an ornamental design or color different from that of an adjacent portion to produce a frame-like portion operable to optically emphasize exposed indicia on a printed page.

The invention has been found to have utility to increase concentration, comprehension, and increase the speed of readers having normal vision. In persons having focal or dominance vision problems, the guide has been found to advantage as an aid in causing eyes to focus readily.

A more thorough and comprehensive understanding may be had from the detailed description of the preferred embodiment when read in connection with the drawings forming a part of this specification.

BRIEF DESCRIPTION OF THE DRAWINGS

FIG. 1 is a plan view of the combination book mark and reading guide of this invention.

FIG. 2 is a plan view of the combination book mark and reading guide showing to advantage a further species of the invention including a tabular and text reading line.

FIG. 3 is a plan view of the combination book mark and reading guide showing another species of the invention for use with multi-column printed matter.

Figure 4:
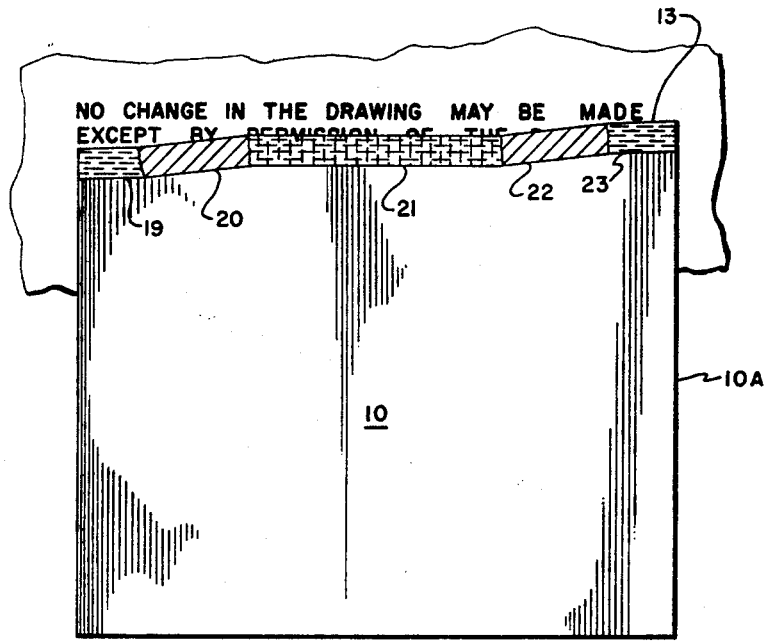
FIG. 4 is a plan view of a combination book mark and reading guide of this invention shown applied to a printed page for illustrative purposes.

DETAILED DESCRIPTION OF THE PREFERRED EMBODIMENT:

Referring now to the drawings, the combination book mark and reading guide is shown in a separate form or species in each of the figures. The species shown differ only in their respective general configurations depending upon specific use in different reading environments. The species shown in the FIG. 1 is identified by the numeral 10, the combination book mark 11 of this invention is shown in FIG. 2, and the species shown in the FIG. 3 is identified by the numeral 12. It has been found in practice of optimum advantage to provide a combination book mark and reading guide generally the same width as the printed column of data being read. Hence, the book mark and reading guide 10 shown is FIG. 1 is one which may generally be used with printed matter having only one column per printed page. The guide 11 is specifically designed for reading of single columns having both tabular indicia, such as columns of numerals, as well as printed text. That is to say the guide 11 is provided with a plurality of reading lines hereinafter later described. The reading guide 12 is designed for use with printed matter having multiple columns such as printed patents wherein only one portion of the guide includes a reading line. Suffice it to say that each of the guides 10, 11, and 12 comprise card-like body portions identified respectively by the indicia 10A, 11A, and 12A which are used and employed to cover a substantial portion of printed matter on a page.

Each of the guides are provided with at least one irregular reading line 13 forming one of the terminal edges of the respective guides. The irregular reading line 13 comprises a multiplicity of adjacent plain line segments 14, 15, 16, 17, and 18. In use, the segments tend to cover different portions of printed matter tending to cause the eyes of the user to focus upon the fully exposed indicia immediately above the printed matter partially exposed because such matter tends to form an ornamental frame-like pattern differing in appearance from the fully exposed indicia being read. That is to say that, since the shape is not continuously level, but is separated into five regions, a center region comprising less than one-half of the border, preceded by a lowered region and followed by a raised region, tends to promote accurate fixation of the eyes following the return sweep movement toward the next printed line of indicia. Therefore, the raised region indicated by segment 18 tends to cue the eyes for refixation as the eyes reach the end of a line of print. In order to further emphasize and create a frame-like pattern to optically emphasize the fully exposed indicia, it has been found to advantage to provide a multiplicity of border-like portions 19, 20, 21, 22, and 23 distally disposed adjacent each of the respective segments, in which each of the border-like portions are of a distinctive design. It is to be understood that a different color, a different ornamental design such as dotted lines, or an embossed design may be used for the respective border-like portions. The brighter colors, or open geometric patterns, in the border segments 20, 21 and 22 appear to cause the eyes to be drawn toward these portions, thereby facilitating fewer fixation pauses. On the other hand, darker colors or muted patterns of the segments 19 and 23 tend to inhibit fixations of the reader.

The geometric pattern formed by the segments 14, 15, 16, 17, and 18 of the reading line 13 and the border-like portions 19, 20, 21, 22, and 23 may comprise a first segment one-sixteenth of the width of the guide more or less, a second segment inclined upwardly from the first segment, the second segment being one-eighth of the width of the guide more or less, a third substantially straight horizontal segment being one-half of the width of the guide more or less, a fourth segment inclined upwardly from the third segment, the fourth segment being one-eighth of the width of the guide more or less, and a fifth substantially straight horizontal segment being one-sixteenth of the width of the guide more or less. Although other arrangements have been found to be of equal advantage to different individual persons, the arrangement above described appears to be more universally acceptable and adaptable to most persons.

It is to be understood that the combination book mark and reading guide of this invention may include more than one reading line 13. That is to say a guide made in accordance with the teachings of this invention may have as many as four separate reading lines 13 on the respective terminal edges of the body portion thereof.

Referring now to the FIG. 2 showing to advantage a guide 11 having a tabular data reading line 13A and a text reading line 13, the reading lines 13 and 13A are identical in form except that the border-like portions of line 13A are darker and more dense than the reading line 13 border-like portions. For convenience the respective line segments and border-like portions of the reading line 13A include a suffix A for identification. In practice a more dark or dense border has been found to tend to aid in reading tabular indicia. Hence in the species shown, the reading lines 13A would tend to be of more utility in reading tabular indicia while the reading line 13 would be more suitable for general reading.

The invention has been found to have utility to increase concentration, comprehension, and increase the speed of readers having normal vision. In persons having focal or dominance vision problems, the guide has been found to advantage as an aid in causing eyes to focus readily.

Having thus described in detail a preferred apparatus which embodies the concepts and principles of the invention and which accomplishes the various objects, purposes and aims thereof, it is to be appreciated and will be apparent to those skilled in the art, that many physical changes could be made in the apparatus without altering the inventive concepts and principles embodied therein. Hence, it is intended that the scope of the invention be limited only to the extent indicated in the appended claims.

I claim:

1. In a combination book mark and reading guide a card-like portion including an irregular reading line formed by a multiplicity of adjacent plain line segments along one of the terminal edges thereof, said reading line comprising at least a first horizontal segment, a second segment being inclined upwardly, a third horizontal segment, a fourth segment being inclined upwardly, and a fifth horizontal segment.

2. The article of claim 1 including a multiplicity of border-like portions distally disposed adjacent a respective line segment, each of said portions having an ornamental design different from a respective portion adjacent thereto.

3. The article of claim 2 wherein said card-like portion is the approximate width of a printed column of a text to be read and said plain line segments of said irregular reading line comprise a first segment one-sixteenth of the width of the guide more or less, a second segment inclined upwardly from the first segment, the second segment being one-eighth of the width of the guide more or less, a third substantially straight horizontal segment being one-half of the width of the guide more or less, a fourth segment inclined upwardly from the third segment, the fourth segment being one-eighth of the width of the guide more or less, and a fifth substantially straight horizontal segment being one-sixteenth of the width of the guide more or less.

* * * * *